United States Patent [19]

Thomson

[11] 3,832,866
[45] Sept. 3, 1974

[54] FRICTION CLUTCH APPARATUS

[75] Inventor: Kenneth W. Thomson, Rochester, N.Y.

[73] Assignee: Eastman Kodak Company, Rochester, N.Y.

[22] Filed: Dec. 14, 1972

[21] Appl. No.: 315,052

[52] U.S. Cl. .............................. 64/27 C, 192/56 C
[51] Int. Cl. ............................................ F16d 3/14
[58] Field of Search.... 64/15 C, 15 R, 27 C, 27 CT, 64/29, 30 E; 192/67 R, 48.3, 48.6, 41 S, 56 C, 81, 54, 55

[56] References Cited
UNITED STATES PATENTS
2,983,122   5/1961   Polzin ................................. 64/27 C Primary Examiner—Samuel Scott
Assistant Examiner—Frank H. McKenzie, Jr.
Attorney, Agent, or Firm—L. P. Kessler

[57] ABSTRACT

A friction clutch for providing a yieldable friction drive coupling between a drive member and a member to be driven, the drive and driven members being capable of relative axial movement. The clutch comprises a helical spring body wound in frictional engagement on one of the members, the helical spring having an end portion extending from the last coil along the spring body in the direction of the longitudinal axis thereof. The extending end portion forms a key which cooperates with a keyway integrally formed in the other member. The cooperation of the key and the keyway permits relative axial movement between the drive and driven members without interrupting the positive friction drive connection therebetween.

4 Claims, 3 Drawing Figures

FRICTION CLUTCH APPARATUS

BACKGROUND OF THE INVENTION

1. Field of the Invention

This invention relates to clutches and more particularly to spring type friction clutches.

2. Description of the Prior Art

A well known arrangement for providing a friction drive coupling between rotary power train members involves the use of a spring friction clutch. The spring friction clutch has a helical body portion wound on either the driving member or the member to be driven to have a frictional engagement therewith. One end of the spring is fixedly attached to the other member. Under normal operating conditions, rotation of the drive member will thus be imparted to the driven member. The orientation of the windings of the spring, however, is such that rotation of the drive member in the direction of drive places a friction force on the spring in a direction tending to open the convolutions of the spring. If the fixed end meets some given magnitude of resistance, the convolutions will tend to open thus lessening the friction force and permitting relative rotation between the members. Selection of the spring constant determines the magnitude of the resisting force which will cause the friction force to be overcome. Examples of spring clutches in various environments are shown in U.S. Pat. Nos. 2,833,383 in the name of Christiansen; 3,314,580 in the name of Parker; 3,659,798 in the name of Mindler et al.; and Re. 26,789 in the name of Robinson et al. Spring clutches of the described type, however, require a fixed axial orientation between the drive and driven members; no relative axial movement has been heretofore possible.

SUMMARY OF THE INVENTION

It is therefore the primary object of this invention to provide a novel spring friction clutch capable of frictionally interconnecting a drive member and a member to be driven when the drive member and the member to be driven are capable of relative axial movement.

There is therefore herein provided a spring friction clutch having a helical spring body wound on a drive member for frictional engagement therewith. The helical spring body has an end portion extending from the last coil along the body in the direction of the longitudinal axis thereof, this end portion forming a key. The key is located in a keyway integrally formed in the driven member. The key and keyway thus cooperate so as to permit relative axial movement between the drive member and the driven member without interrupting the yieldable friction drive connection between the members.

DESCRIPTION OF THE PREFERRED EMBODIMENTS

Figure 1:
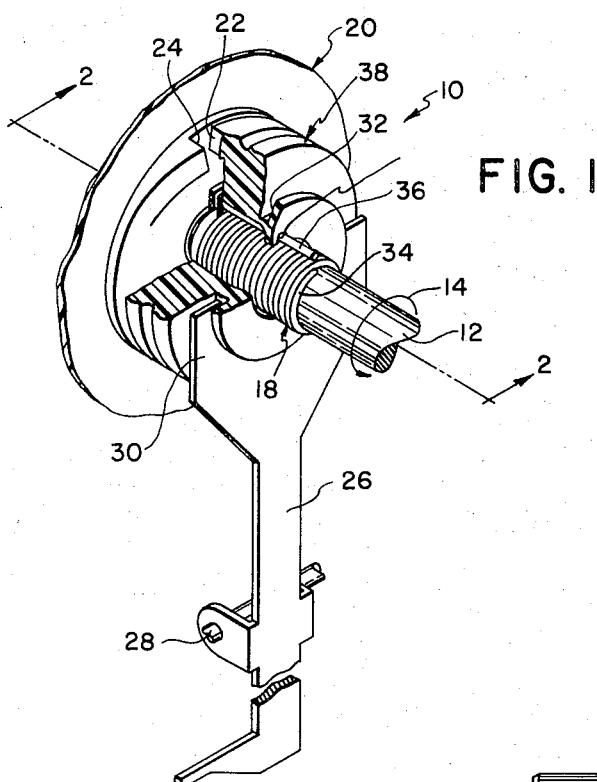
FIG. 1 is a perspective view partly in section of a rotary power train including a spring friction clutch according to this invention.

Referring now to the drawings, FIG. 1 shows a rotary power train 10 having a main drive shaft 12 rotating in the direction of the arrow 14. The drive shaft 12 drives an intermediate driven member 16 which is coupled to the drive shaft 12 by means of the novel spring friction clutch 18 of this invention to be described more fully hereinbelow. The intermediate driven member 16 selectively drives an ultimate driven member 20 through intermeshing drive teeth 22 and 24 located respectively on the intermediate driven member 16 and ultimate driven member 20.

Figure 2:
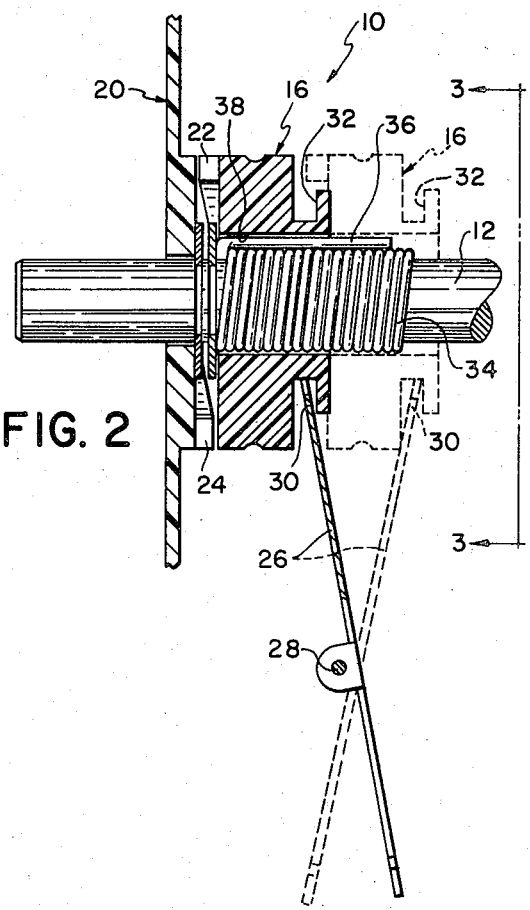
FIG. 2 is a sectional view of the rotary power train taken along lines 2—2 of FIG. 1.

Selective engagement of the drive teeth 22 and 24 is accomplished by axial movement of the intermediate driven member 16 from an engaged position shown in solid lines in FIG. 2 and a disengaged position shown in dotted lines in the same Fig. This axial movement is accomplished through a lever 26 which is mounted for pivotable movement about the axis 28. One end of the lever 26 has a yoke portion 30 which engages a retaining groove 32 integrally formed with the intermediate driven member 16.

The spring friction clutch 18 which provides the positive drive interconnection between the drive shaft 12 and the intermediate driven member 16 is comprised of a helical wound spring body 34 in frictional engagement with the shaft 12. The helical spring body 34 has an end portion 36 which extends from the last coil along the body 34 in the direction of the longitudinal axis thereof. This end portion 36 serves to form a key which cooperates with a keyway 38 integrally formed in the body of the intermediate driven member 16 to permit the positive friction drive of the intermediate driven member 16 by the drive shaft 12. Further, this interaction between the key 36 and the keyway 38 serves to guide the intermediate driven member 16 and permit its axial movement relative to the shaft 12 for selective engagement of the teeth 22 with the teeth 24 of the ultimate driven member 20.

Figure 3:
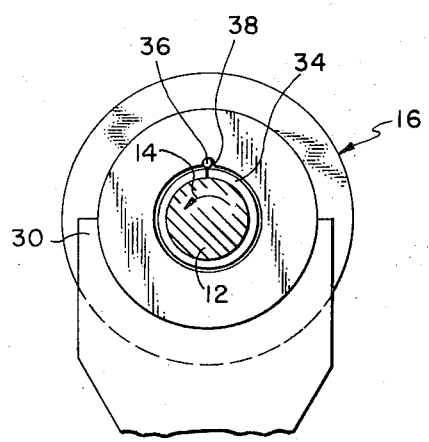
FIG. 3 is an end view of the rotary power train taken along the lines 3—3 of FIG. 2.

As best shown in FIG. 3, the convolutions of the helical spring body 34 are oriented such that the resistive force in the intermediate driven member 16 resulting from the interaction of the teeth 22 and 24 causes the keyway 38 to exert a force on the end portion 36 which, in turn, tends to unwind the convolutions of the spring friction clutch 18. A spring constant is selected for the spring friction clutch 18 such that it will take a specific magnitude of resistive force to overcome the frictional engagement of the clutch 18 with the shaft 12. When this magnitude is exceeded, the opening of the convolutions will permit the spring friction clutch 18 to rotate relative to the drive shaft 12 thus allowing the intermediate driven member 16 to slip relative to the drive of the shaft 12.

From the foregoing, it is readily apparent that there is herein provided a novel spring friction clutch for a rotary power train which permits the drive and driven members to move relatively axially without interrupting the drive coupling therebetween. The spring friction clutch has a helical spring body wound with an end portion of the last coil extending along the spring body in the direction of the longitudinal axis. The end portion forms a key which, in cooperation with a keyway in one member of the power train permits relative axial movement while maintaining the positive friction drive connection.

The invention has been described in detail with reference to a preferred embodiment thereof, but it will be understood that variations and modifications can be effected within the spirit and scope of the invention.

I claim:

1. In a rotary power train, a rotary drive shaft, a driven member mounted on said drive shaft for relative axial movement with respect thereto, and yieldable friction clutch means interconnecting said drive shaft and said driven member to impart yieldable frictional rotary drive coupling between said driven member and said drive shaft and guided relative axial movement therebetween, said means including a helical spring body wound on said drive shaft, said helical spring having an end portion of the last coil extending along said body in the direction of the longitudinal axis thereof, said end portion forming a key, and wherein said driven member has a keyway integrally formed therein said key of said helical spring end portion cooperating with said keyway of said driven member to permit relative axial movement therebetween without interrupting the drive coupling between said drive shaft and said driven member.

2. A spring clutch for providing yieldable friction drive coupling between a drive member and a relatively axially movable driven member in a rotary power train, said spring clutch comprising a helical spring body wound on one of said members in frictional engagement therewith, said helical spring having an end portion of the last coil extending from said helical spring body, said end portion forming a key, a keyway formed in said other member, said key engaging said keyway for effecting positive drive engagement between said relatively axially movable members to provide positive friction drive between said drive member and said driven member while permitting relative axial movement therebetween.

3. The structure of claim 2, wherein said helical spring body is wound on said drive member and said keyway is formed in said driven member.

4. The structure of claim 2, wherein said end portion of the last coil extends from said helical spring along said body in the direction of the longitudinal axis thereof.

* * * * *